No. 668,939. Patented Feb. 26, 1901.
T. L. WARDROP.
CORD KNOTTER FOR SELF BINDING HARVESTERS.
(Application filed Nov. 27, 1899.)
(No Model.) 4 Sheets—Sheet 1.

WITNESSES:

K. M. Imboden,
M. L. Lauge.

INVENTOR,

Thomas L. Wardrop.

BY HIS ATTORNEYS,

Higdon & Higdon.

No. 668,939. Patented Feb. 26, 1901.
T. L. WARDROP.
CORD KNOTTER FOR SELF BINDING HARVESTERS.
(Application filed Nov. 27, 1899.)
(No Model.) 4 Sheets—Sheet 2.

WITNESSES:
K. M. Imboden,
M. L. Lauge

INVENTOR,
Thomas L. Wardrop.
BY HIS ATTORNEYS,
Higdon & Higdon.

THE NORRIS PETERS CO., PHOTO-LITHO., WASHINGTON, D. C.

No. 668,939. Patented Feb. 26, 1901.
T. L. WARDROP.
CORD KNOTTER FOR SELF BINDING HARVESTERS.
(Application filed Nov. 27, 1899.)
(No Model.) 4 Sheets—Sheet 3.

WITNESSES:
K. M. Imboden,
M. L. Laugh

INVENTOR,
Thomas L. Wardrop.
BY HIS ATTORNEYS,
Higdon & Higdon.

No. 668,939. Patented Feb. 26, 1901.
T. L. WARDROP.
CORD KNOTTER FOR SELF BINDING HARVESTERS.
(Application filed Nov. 27, 1899.)
(No Model.) 4 Sheets—Sheet 4.

Witnesses,
B. Bark
F. A. Spencer.

Inventor,
Thomas L. Wardrop.
by his Attorneys,
Hyson & Hyson.

UNITED STATES PATENT OFFICE.

THOMAS L. WARDROP, OF HUNNEWELL, KANSAS.

CORD-KNOTTER FOR SELF-BINDING HARVESTERS.

SPECIFICATION forming part of Letters Patent No. 668,939, dated February 26, 1901.

Application filed November 27, 1899. Serial No. 738,387. (No model.)

*To all whom it may concern:*

Be it known that I, THOMAS L. WARDROP, a citizen of the United States, residing at Hunnewell, county of Sumner, and State of Kansas, have invented certain new and useful Improvements in Cord-Knotters for Self-Binding Harvesters, of which the following is a specification.

My invention relates to improvements in cord-knotters for self-binding harvesters, and especially to the details of the construction and operation of the rotating prongs constituting the knotter proper, whereby the knot may be effectually tied and subsequently released from the knotter without the use or interposition of any auxiliary or special mechanism, such as is ordinarily employed, to effect the release of the completed knot.

Figure 1:
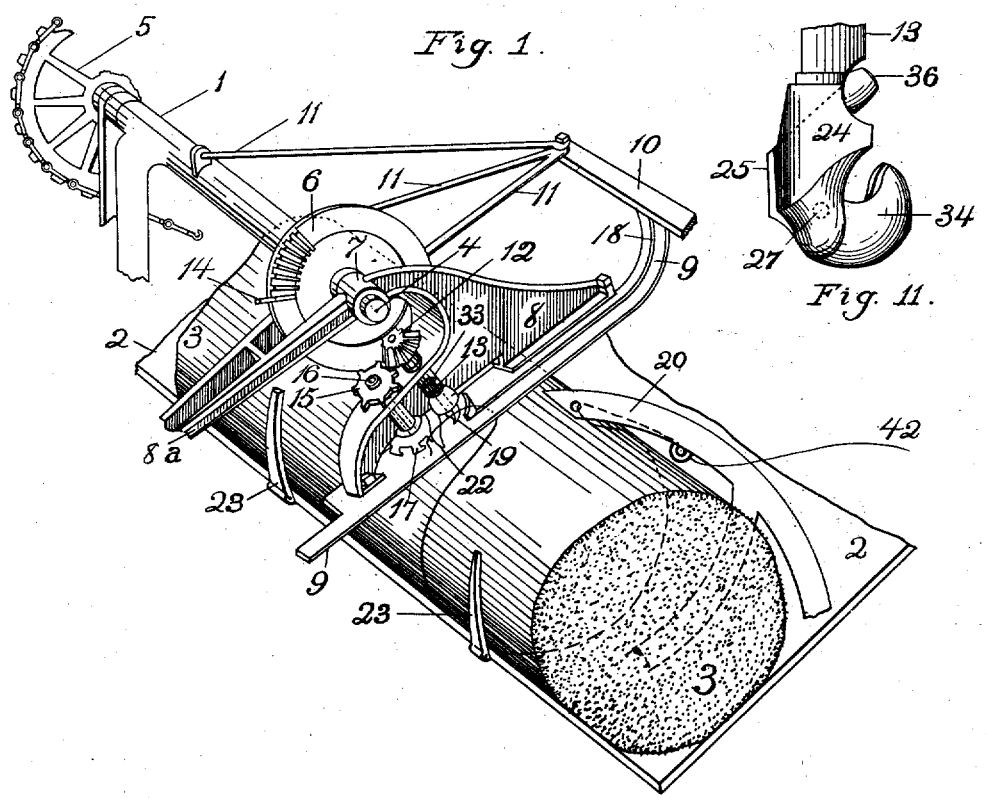
Figure 11:
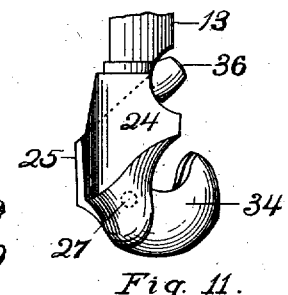
Figure 16:
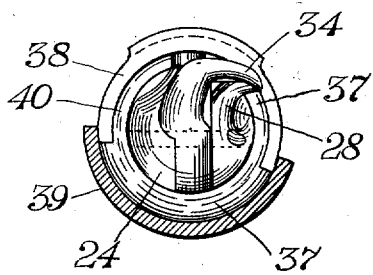
Figure 14:
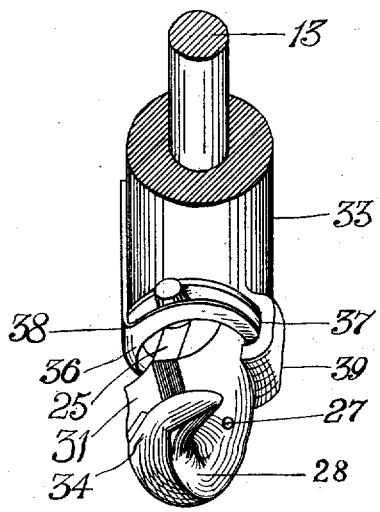
Figure 15:
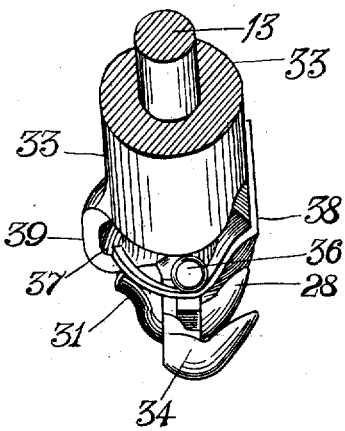

In the accompanying drawings, Figure 1 is a perspective view of the side of a harvester, showing the knotter in its position relative to the adjacent and coöperating parts of the machine. Figs. 2, 3, 4, and 5 are detached geometrical views of one of the two members of the cord-knotter proper, said views being from points of view ninety degrees apart. Figs. 6, 7, 8, and 9 are similar detached views of the other member of the knotter, herein termed the "pivoted" member, taken from the same points of view as Figs. 2, 3, 4, and 5, respectively. Figs. 10, 11, 12, and 13 are similar views of the two members of the knotter pivoted together in operative position, taken from points of view corresponding, respectively, to Figs. 2 and 6, 3 and 7, 4 and 8, and 5 and 9. Fig. 14 is a perspective view, partly in section, of the two members of the knotter pivoted together in operative position, from a point of view half-way between those of Figs. 13 and 10, also showing part of the sleeve in which the stem of the knotter is mounted and the cam-track and spring which support the roller-carrying head of the pivoted member of the knotter during the operation. Fig. 15 is a perspective and partially-sectional view on the side of the sleeve opposite to that shown in Fig. 14 at a later stage of the operation. Fig. 16 is a view, partly in section, from under the knotter looking upward, showing the bottom surfaces of both prongs of the knotter, the bottom of the spring which supports the roller on the pivoted member of the knotter during a portion of the revolution of said knotter, and also the sleeve and cam-track therein which support and guide said roller during a part of said revolution. Figs. 17, 18, 19, and 20 are a series of views illustrating the successive positions taken by the prongs of the knotter and also by the strands of the twine during the tying of the knot.

In Fig. 1, 1 designates a tubular arm mounted at the side of the binder-deck 2 and extending inwardly across the path of the straw 3, said arm forming a bearing for the knotter-shaft 4, actuated by a gear 5, which shaft carries a segmental gear 6, rigidly mounted thereon. Said shaft 4 also supports, but rotates in, a fixed hub 7, integral with a bracket 8, to which is secured the breastplate 9, attached at one end to the cross-bar 10. Braces 11 and an arm $8^a$ of the bracket 8, extending to stationary parts of the machine, assist in maintaining the rigidity of the described structure suspended from the hub 7. The segment 6 actuates, intermittently, the beveled pinion 12, secured on the upper end of the knotter-stem 13, rotatably mounted in a vertical bearing in bracket 8, and said segment also actuates, by means of an extended cog 14, the toothed wheel 15 in a lower plane than pinion 12, carrying the similarly-mounted shaft 16 of the disk 17, said wheel and disk being advanced one step at each revolution of segment 6.

18 designates a slot in the breastplate 9, extending inwardly from a point near the knotter 19, in which slot the curved needle 20, mounted on a shaft underneath the deck 2, is adapted to oscillate and carry the twine to the knotter 19 and cutter 22, making two throws to each complete revolution of the knotter.

23 designates the compressor-arms, which assist in holding the straw during the tying operation in the usual manner.

Referring to Figs. 2 to 14, the knotter proper is composed of two members 24 25, one of which, 24, is integral with or rigidly secured to the rotating stem 13, driven by the beveled pinion 12, and the other, 25, is pivotally mounted within an open slot 26 in the member 24, the result of which construction is that while both said members partake of the rotary motion of the stem 13 the pivoted member 25 has a second limited rotary movement about the pivot-pin 27, by which it is connected to the part 24. The means for effecting said second rotary movement will be hereinafter described.

Figs. 2, 3, 4, and 5 are views ninety degrees apart of the member 24 of the knotter detached—that is, the view-point of the observer being supposed to remain constant said figures represent, successively, at intervals of ninety degress the appearance of the part if rotated from left to right, as it would be in the knot-tying process. The part 24 has a forwardly and laterally projecting prong 28 and open slot 26, beforementioned, extending through the part, but having an inclined roof 29, as shown in dotted line in Fig. 3; also, a transverse passage 30 to receive the pivot-pin 27, by which parts 24 and 25 are pivoted together; also, a shallow concave groove 31, extending about three-quarters of the way around it; also, projecting shoulders 32, which fit into corresponding recesses in the sleeve 33, in which said part rotates.

Figures 10, 12, 13:
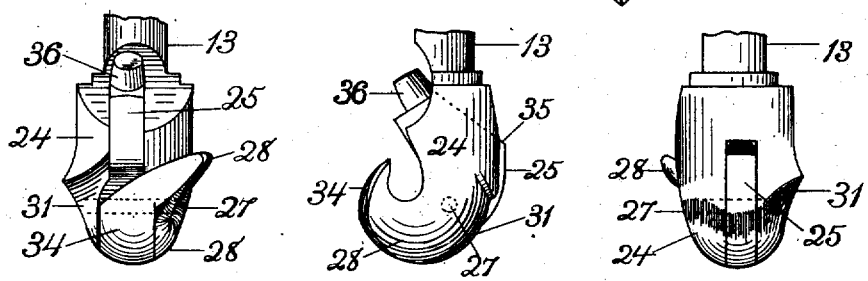
Figure 2:
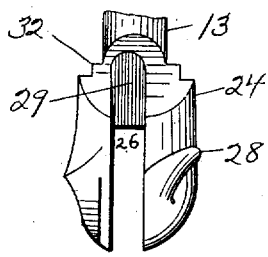
Figure 3:
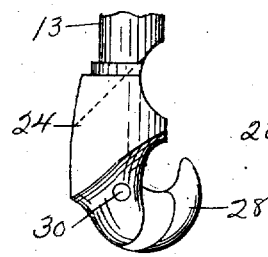
Figure 4:
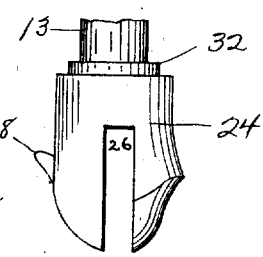
Figure 6:
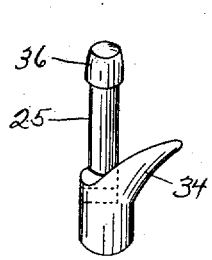
Figure 5:
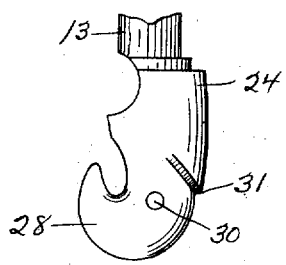
Figure 7:
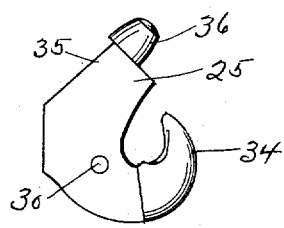
Figure 8:
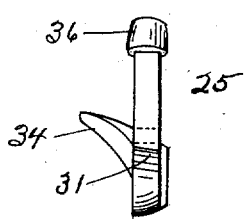
Figure 9:
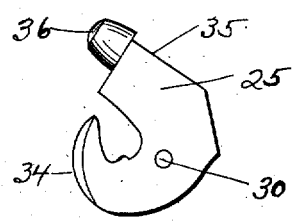

Figs. 6, 7, 8, and 9 show the pivoted part 25 of the knotter detached, in positions corresponding to the views in Figs. 2, 3, 4, and 5 of the part 24. This part also has a forwardly and laterally projecting prong 34 of substantially the same shape and extending in the same direction as prong 28 on part 24, but somewhat larger and longer, so that when placed together and in normal position, as shown in Fig. 10, which may be termed a "front" view, the prong 34 will stand in front of prong 28 and cover it, their points being in contact and in this position practically one point. The pivot-hole 30 passes through the lower portion of part 25, and the upper edge 35 of said part is inclined at an angle corresponding to the sloping roof 29 of the slot 26. The groove 31 also appears in part 25, as shown in Figs. 7, 8, and 9, so that when the parts 24 25 are together in normal position, as in Figs. 11, 12, 13, and 14, said groove extends continuously about three-quarters of the way around the knotter. The upper end of part 25 carries a roller 26, by which it is oscillated, as hereinafter described.

Figs. 10, 11, 12, and 13 show the parts 24 25 of the knotter pivoted together and in normal operative positions ninety degrees apart, corresponding to the views already described of the parts detached. It will be seen that the general form of the lower portion of the knotter when the prongs 24 and 25 are united is that of a volute or spiral cone having its apex at the points of said prongs.

It has been stated that part 25 of the knotter partakes of the lateral rotation of part 24 on the stem 13 and that it also has a limited rotation in a vertical plane on the pivot 27. The latter movement is effected by the engagement of the roller 36 on the head of part 25 with the cam-track 37 and spring 38. (Shown in Figs. 14, 15, and 16.) The sleeve 33 extends vertically through the bracket 8, and the knotter-stem 13 rotates therein. On the lower end of said sleeve is formed a peripheral bulge or extension 39, within which is formed a cam-track 37, extending obliquely from near the point where the roller 36 lies when the part 25 begins its movement on the pivot 27 to a point on the opposite side of the sleeve where the extreme limit of such movement has been reached.

The spring 38 is secured on the side of the sleeve 33, as shown in Figs. 14 and 15, and is bent inwardly at a point far enough below the upper edge of cam-track 37 to provide a passage-way for roller 36 between its flanged end and said edge of the cam-track. Said flanged end is crescent-shaped, with one horn longer than the other, and its function is not only to support roller 36 while upon that side of its path, but by its stress to force the roller quickly up the abrupt slope of the cam after its limit of movement has been passed, thus suddenly closing the jaws of the prongs 28 34.

As shown in Fig. 14, the roller 36 and pivoted part 25 of the knotter are in normal position and the roller is beginning to descend the slope of the cam-groove 37, the effect of which is to tilt part 25 and separate the points of the prongs 28 34, as shown in Fig. 15. The limit of the movement will be reached when the roller in passing down the cam arrives at about the point shown in Fig. 15, being about the point 40 in Fig. 16, at which point the upper edge of the cam-track suddenly changes to normal, carrying the roller 36 and part 25 and also prongs 28 34 to corresponding normal positions. The upper edge of the cam-groove is continuous all the way around the sleeve 33, and the roller 36 is in constant contact with it; but the lower edge, contained in the extension 39, Figs. 15 and 16, extends only partly around, the roller 36 being supported during the remainder of its revolution by the spring 38, as shown in Fig. 16.

In Figs. 1, 17, 18, 19, and 20 a twine holding and cutting device is shown, consisting of a disk 17 and cutter 22, which is not claimed as a part of my invention and may be of any preferred construction, provided that it effects the object of catching and holding of the ends of the twine when brought to it by the throws of the needle, holds them with proper tension during the knot-tying process, and cuts them off at the conclusion of said process. As shown in Fig. 1, the cutting device is mounted horizontally near the knotter, immediately above the breastplate 9, and is actuated as hereinbefore stated. The deeply-grooved or V-shaped cutter 22 is mounted on the under side of bracket 8 and incloses the edge of the toothed disk 17 on each side and has at its end upon each side a knife-edge 21, against which the ends of the doubled twine are pressed and held during the tying operation and are finally cut by a quick advancement of said disk. At the inner end of the slot 18, in which the needle 20 plays, in close proximity to the knotter 19, is an upturned flange 41, integral with the breast-plate 9 or attached. Said flange has a concave upper edge, with the inner margin nearest the knotter extending up higher than the outer margin. The function of this flange is to hold the strands of twine in proper relation to the knotter during the operation, keeping the tension in the proper direction.

As shown in Fig. 1, the needle 20 has made one throw through the slot 18, carrying the loose end of the twine 42 into the jaw of the cutting device and leaving it there has again retreated. The straw pushing down the slope of the deck has accumulated against the compressor-arms 23, distending the twine also on that side, and the returning needle now brings the twine with it again, carrying it around the inclosed bundle, and is about to again throw it into the jaw of the cutter, after which the knot-tying operation begins.

In the figures illustrating the knot-tying operation the strands of the twine are represented as somewhat slack in order to show more clearly the exact course of the strands; but it is to be understood that throughout said operation the twine is under considerable tension, being firmly held on one side of the knotter in the jaw of the cutter 22 and on the other side being subject to the strain from the bundle. This tension is practically constant until the twine is cut and continues afterward from the end toward the bundle until the completed knot is pulled by said tension off from the points of the prongs.

Figure 20:
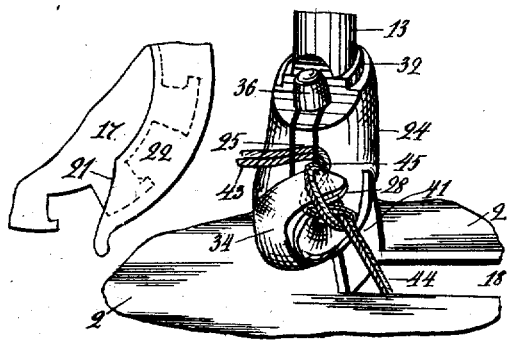
Figure 18:
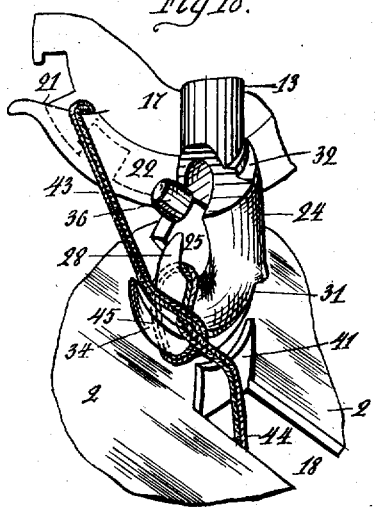
Figure 19:
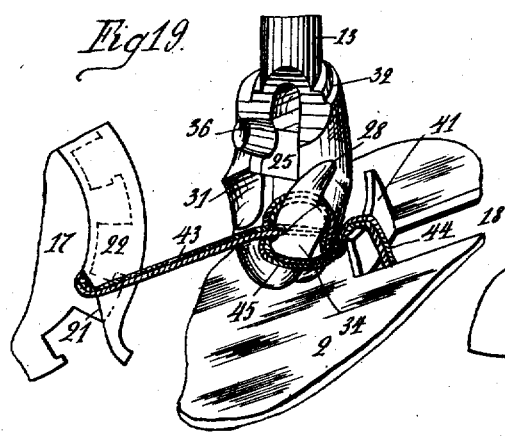
Figure 17:
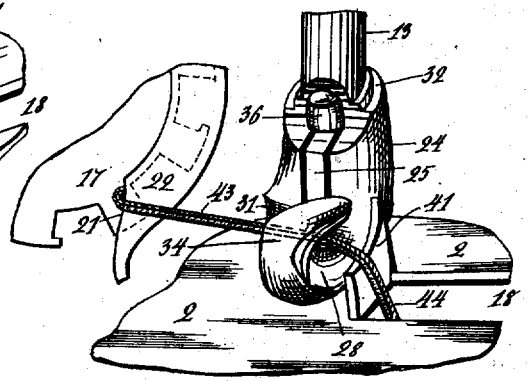

It may be stated in general terms that the knot is effected by the rotation of the knotter 19, in the course of which rotation the points of the prongs 28 34 engage the doubled twine which lies in their path, after which, the rotation continuing, the oppositely-extending strands 43 44 are made to cross each other, forming a loop 45, which passes around both prongs 28 34. The rotation continuing, the end of the twine held in the jaws of the cutter 22 then passes between the prongs 28 34, which have now become separated by the operation of the cam 37 and roller 36 on the head of prong 34, as described. Soon after the crossing of said strands and the formation of said loop 45 have been effected the prongs are suddenly closed by the operation of said cam and spring 38, and the strand 43, extending toward the cutter 22, is firmly grasped and held between the prongs 28 34. Said strand is then cut by the operation of the disk 17 pushing the strand suddenly into the jaws of the cutter 22. The cut end, however, is still firmly held between the prongs 28 34, and the continued tension from the bundle end of the twine 44 and the continued rotation of the prongs 28 34 carries the loop 45 off the points of the prongs, completing the knot, at which moment the cut end is still held between the points of the prongs, but is immediately released by the operation of the cam, again separating said points. Referring to the drawings, at the beginning of said operation the two prongs 28 34 of the knotter are closed together in the position shown in Figs. 10, 14, 16, and 17. The doubled twine, being held in the jaw of the cutter 22 by pressure of disk 17, passes across both prongs and at the other end passes down over flange 41 through slot 18, whence one strand passes to one side of the bundle 3 and the other strand to the other side. As shown in Fig. 17, both strands of the twine lie inside of both prongs 28 34 of the knotter, the pivoted prong 34 being outside or in front of the other. The prongs then rotate to the right, increasing the tension on the twine, the bundle end of which, 44, is prevented from slipping off flange 41 by the upward extension thereof. The cutter end 43 of the twine first bears against the concave groove 31 and afterward, owing to the tension, slides down over the convex or spheroidal under surface of the knotter toward the points of the prongs. The bundle end does the like until, after the knotter has made about three-quarters of a revolution, the twine and parts have taken the position shown in Fig. 18. During this movement also the prongs have separated by the action of roller 36 on the head of the pivoted part 25 of the knotter engaging cam-track 37. A loop 45 has been formed in the twine extending around both prongs, the strands 43 44 have crossed each other, and the end 43, held by the cutter, is passing between the prongs. Fig. 19 shows a continuation of the movement, the knotter having made about a quarter-turn farther to the right, the loop 45 still extending around both prongs, and the end of twine 43, held by the cutter, has passed lower down between the prongs into position to be seized by them, when they are made to close. This figure represents the prongs at the moment of their widest separation, the roller 36 on the head of the pivoted member 25 having reached the extreme point in the curvature of the cam-track 37, as shown in Fig. 15. Fig. 20 shows the position after a brief continuation of the movement from the point shown in Fig. 19. The roller 36 has passed the extreme point of the cam and slipped suddenly back to normal position, as in Fig. 16, bringing the prongs again together, holding tightly between them the cut end 43 of the twine, which has almost simultaneously been severed by the operation of the cutting device. The loop 45 (shown in Figs. 18 and 19) is being pulled over the ends of the prongs, which will complete and tighten the knot, after which, the prongs relaxing, the tension from the bundle will draw the knotted end from between the prongs and down through slot 18, after which the knotter is ready for the next operation.

It will be noted that the formation of the knot is facilitated and largely effected by the peculiar curvatures and elongated spheroidal form of the under surfaces of the knotter, the effect of which, in connection with tension from two directions, as described, is to cause the strands to slip toward the points of the prongs into a position to be released from the prongs as soon as the formation of the knot has been effected. By this peculiar conformation and the proper regulation of the direction of the tension the completed knot is made to slip off the prongs without the intervention of any auxiliary or special mechanism for releasing the knot.

As shown in the drawings, the convolutions of the cord in forming the knot are shown somewhat relaxed for greater clearness of delineation; but it is obvious that in practice the tension would prevent the curves shown and draw the convolutions into more abrupt and compact form.

Although in practice the knotter described would naturally be mounted in an approximately vertical position, it is not necessary to so mount it; but it would be equally operative in any other position, provided that the tension on the twine is kept in the proper direction. It is also obvious that it is immaterial whether the prongs of the knotter be so formed as to operate by rotation to the right, as described herein, and that by proper changes in form and in the location of coöperating parts they would operate in the same manner by rotation to the left.

I claim as my invention and desire to secure by Letters Patent—

The combination with a self-binding harvester, of a cord-knotter consisting of two rotatable members 24 and 25, one of which, 25, is pivoted in a vertical slot in the body of the other, 24, so as to have a secondary oscillation therein; said member 24 being provided with a downwardly-projecting prong 28, and member 25 having a similar prong 34, said prongs being so formed that their adjacent surfaces register with each other when the prongs are forced together, they then having roughly the form of a spiral or twisted cone, at the apex of which the tips of said prongs meet each other; a roller 36 pivoted on the head of the pivoted member 25, a sleeve 33, in which the stem 13 of the slotted member 24 rotates, a channel-cam 37 formed around a portion of the periphery of said sleeve and opening inwardly to receive and guide said roller, and a crescent-shaped spring 38 mounted on said sleeve, for supporting said roller and prong 34 when said roller is not engaged by channel-cam 37; substantially as described.

In testimony whereof I affix my signature in the presence of two witnesses.

THOMAS L. WARDROP.

Witnesses:
C. L. CROOKHAM,
C. WOOD.